(12) United States Patent
Muramatsu et al.

(10) Patent No.: US 11,692,104 B2
(45) Date of Patent: Jul. 4, 2023

(54) ITO PARTICLES, DISPERSION, AND PRODUCTION METHOD OF ITO FILM

(71) Applicants: TOHOKU UNIVERSITY, Sendai (JP); NIKON CORPORATION, Tokyo (JP)

(72) Inventors: Atsushi Muramatsu, Sendai (JP); Kiyoshi Kanie, Sendai (JP); Ryoko Suzuki, Tokyo (JP); Yasutaka Nishi, Tokyo (JP); Makoto Nakazumi, Tokyo (JP)

(73) Assignees: TOHOKU UNIVERSITY, Sendai (JP); NIKON CORPORATION, Tokyo (JP)

(*) Notice: Subject to any disclaimer, the term of this patent is extended or adjusted under 35 U.S.C. 154(b) by 43 days.

(21) Appl. No.: 16/928,855

(22) Filed: Jul. 14, 2020

(65) Prior Publication Data

US 2021/0002495 A1    Jan. 7, 2021

Related U.S. Application Data

(63) Continuation of application No. PCT/JP2018/043512, filed on Nov. 27, 2018.

(30) Foreign Application Priority Data

Jan. 15, 2018 (JP) .................... 2018-004226

(51) Int. Cl.
*H01B 1/08* (2006.01)
*C09D 5/24* (2006.01)
*C01G 19/00* (2006.01)
*C09D 1/00* (2006.01)
*H01B 13/00* (2006.01)

(52) U.S. Cl.
CPC .............. *C09D 5/24* (2013.01); *C01G 19/006* (2013.01); *C09D 1/00* (2013.01); *H01B 1/08* (2013.01); *H01B 13/00* (2013.01); *C01P 2004/04* (2013.01); *C01P 2006/22* (2013.01); *C01P 2006/40* (2013.01)

(58) Field of Classification Search
CPC .............. H01B 1/08; C09D 5/24; C01G 19/02
See application file for complete search history.

(56) References Cited

U.S. PATENT DOCUMENTS

| 2008/0047466 | A1 | 2/2008 | Tanoue et al. | |
| 2009/0050858 | A1* | 2/2009 | Katusic ............ | C01G 19/006 252/520.1 |
| 2013/0187104 | A1 | 7/2013 | Shiraishi et al. | |

(Continued)

FOREIGN PATENT DOCUMENTS

| CN | 102554261 A | 7/2012 |
| CN | 103360854 A | 10/2013 |

(Continued)

OTHER PUBLICATIONS

Extended European Search Report dated Sep. 6, 2021, for European Application No. 18 89 9911.
International Search Report dated Feb. 19, 2019, in corresponding International Patent Application No. PCT/JP2018/043512.
Office Action, dated Oct. 1, 2021, in corresponding Korean Patent Application No. 10-2020-7020500 (10 pp.).

(Continued)

*Primary Examiner* — Mark Kopec (57) ABSTRACT

Provided is ITO particles satisfying a relationship expressed in Expression (1) given below. $16 \times S/P^2 \leq 0.330 \ldots$ (1) (In the expression, S indicates a particle area in a TEM photographed image, and P indicates a perimeter of the particle).

7 Claims, 3 Drawing Sheets

(FIRST TANK)   (SECOND TANK)   (THIRD TANK)

(56) References Cited

U.S. PATENT DOCUMENTS

| | | |
|---|---|---|
| 2013/0330267 A1 | 12/2013 | Yonezawa et al. |
| 2014/0054521 A1 | 2/2014 | Mahabadi et al. |
| 2014/0147777 A1* | 5/2014 | Inoue .................... G02F 1/167 430/32 |
| 2016/0221031 A1 | 8/2016 | Nishi et al. |

FOREIGN PATENT DOCUMENTS

| | | |
|---|---|---|
| CN | 103903674 A | 7/2014 |
| CN | 105555424 A | 5/2016 |
| JP | 2004-241270 A | 8/2004 |
| JP | 2007-5241 A | 1/2007 |
| JP | 2008-115025 | 5/2008 |
| JP | 20102-85332 | 12/2010 |
| JP | 2011-126746 A | 6/2011 |
| JP | 2012-91953 A | 5/2012 |
| JP | 2013-87027 | 5/2013 |
| JP | 5706797 | 3/2015 |
| JP | 2017-117632 A | 6/2017 |
| KR | 10-2007-0038573 | 4/2007 |
| WO | WO2010/046030 | 4/2010 |
| WO | 2015/064438 A | 5/2015 |

OTHER PUBLICATIONS

Office Action, dated Mar. 2, 2022, in counterpart Taiwan Patent Application No. 11120201870 (21 pp.).

Office Action, dated Apr. 1, 2022, in counterpart Korean Patent Application No. 10-2020-7020500 (10 pp.).

Office Action, dated Mar. 18, 2022, in counterpart Chinese Patent Application No. 201880086445.2 (24 pp.).

Office Action, dated Jun. 4, 2020, in counterpart Taiwan Patent Application No. 10920525610 (10 pp.).

Office Action, dated Dec. 29, 2020, in counterpart Indian Patent Application No. 202017029901 (6 pp.).

Office Action, dated Jun. 8, 2021, in counterpart Japanese Patent Application No. 2019-564328 (9 pp.).

Office Action, dated Feb. 1, 2022, in counterpart Japanese Patent Application No. 2019-534328 (9 pp.).

Office Action, dated May 31, 2022, in corresponding Japanese Patent Application No. 2019-564328 (6 pp.).

Office Action, dated Oct. 27, 2022, in Korean Patent Application No. 10-2020-7020500 (8 pp.).

Office Action, dated Mar. 18, 2023, in corresponding Korean Patent Application No. 10-2020-7020500 (8 pp.).

* cited by examiner

FIG.1

(FIRST TANK)   (SECOND TANK)   (THIRD TANK)

FIG.2

ITO PARTICLES, DISPERSION, AND PRODUCTION METHOD OF ITO FILM

CROSS-REFERENCE TO RELATED APPLICATIONS

This application is a Continuation Application, under 35 U.S.C. § 111(a), of international Patent Application No. PCT/JP2018/043512, filed on Nov. 27, 2018, which claims foreign priority benefit of Japanese Patent Application No. 2018-004226 filed on Jan. 15, 2018 in the Japanese Patent Intellectual Property Office, the contents of both of which are incorporated herein by reference.

TECHNICAL FIELD

The present invention relates to ITO particles, dispersion in which the ITO particles are dispersed, and a production method of an ITO film.

BACKGROUND ART

With regard to indium tin oxide (ITO) particles, Patent Literature 1 discloses ITO particles obtained in the following manner. That is, an indium source and a tin source are added to a solution obtained by dissolving a hydroxide of a quaternary ammonium ion in a reducible organic solvent, and a reaction is performed. Subsequently, heating is performed in an autoclave, and aging is performed under self-generative pressure.

CITATION LIST

Patent Literature

PTL 1: Japanese Patent No. 5706797B

SUMMARY OF INVENTION

A first aspect of the present invention relates to ITO particles satisfying a relationship expressed in Expression (1) given below.

$$16 \times S/P^2 \leq 0.330 \qquad (1)$$

(In the expression, S indicates a particle area in a TEM photographed image, and P indicates a perimeter of the particle.)

A second aspect of the present invention relates to dispersion including the ITO particles described above, dispersed in a solvent.

A third aspect of the present invention relates to a production method of an ITO film, including forming the above-mentioned dispersion into mist, bringing the misted dispersion, into contact with a base plate, and drying the dispersion on the base plate after the contact.

DESCRIPTION OF EMBODIMENTS

Hereinafter, description is made on an embodiment for carrying out the present invention (hereinafter, simply referred to as a "present embodiment") in detail. The present embodiment described below is an example for describing the present invention, and is not intended to limit the present invention to the contents described below. Note that, in the drawings, a positional relationship in a vertical direction, a horizontal direction, or the like is based on a positional relationship illustrated in the drawings, unless otherwise specified. Further, a dimensional ratio in the drawings is not limited to the illustrated ratio.

<ITO Particles>

The ITO particles according to the present embodiment satisfy a relationship expressed in Expression (1) given below.

$$16 \times S/P^2 \leq 0.330 \qquad (1)$$

(In the expression, S indicates a particle area in a TEM photographed image, and P indicates a perimeter of the particle.)

The particle area S and the perimeter P in Expression (1) are an area and a perimeter of the particles in the TEM photographed image, and may be obtained in accordance with a method in Examples described later. A value of the particle area S is not particularly limited, and may fall within a range from 100 $nm^2$ to 4,500 $nm^2$ or from 200 $nm^2$ to 4,300 $nm^2$, for example. Further, a value of P is not particularly limited, and may fall within a range from 100 nm to 1,200 nm or from 120 nm to 1,000 nm, for example.

An upper limit of the left side of Expression (1) is only required to be 0.330 or less. The upper limit is preferably 0.300 or less, more preferably, 0.280 or less, further preferably, 0.260 or less, further more preferably, 0.250 or less. With this range, the particle shape can be formed as a particle shape that is largely deformed from a substantially rectangular parallelepiped shape. Further, a lower limit of a value of the left side of Expression (1) is not particularly limited, and is only required to be greater than 0. The lower limit may be 0.040 or greater, 0.060 or greater, 0.070 or greater, or 0.100 or greater, for example.

The ITO particles according to the present embodiment can be evenly atomized and highly dispersed, and may meet demands such as low resistance, high transmittance, and low turbidity (haze), as a material for various transparent electrodes and the like.

The related-art ITO particles are synthesized by the gel-sol method or the like, and the particle shape is substantially rectangular parallelepiped. With the gel-sol method, a nucleation/nuclear growth reaction takes place in a gel network, and hence the ITO particles produced by the gel-sol method have a rectangular parallelepiped shape in which the crystal phase is reflected, and have high crystallinity.

In a case where an ITO film is produced by using the related-art ITO particles having a substantially rectangular parallelepiped shape, when the ITO particles are arranged to have surfaces brought into contact with each other, a filling ratio of the film is theoretically 100%. Thus, it has been considered that the ITO particles are preferably formed close to a single crystal structure having a rectangular parallelepiped shape. However, as a result of the inventors' intensive research, it has been considered that the surfaces of the ITO particles are not actually brought into contact with each other and that the particles fill randomly to establish a state in which the particles are brought into point contact or line contact. When the particles with this arrangement are used as a transparent conductive film, the number of conductive paths is reduced, and a resistance value is disadvantageously increased. Further, when dispersibility is low, a filling ratio is reduced, or smoothness of the film is lost due to aggregated particles. The inventors of the present invention consider that there is room for improvement regarding the related-art ITO particles in view of this point.

The inventors further proceed the examination, and focus on a comprehensive state in a case of the ITO particles. In this case, it has been found that the ITO particles satisfying a relationship in Expression (1) can unexpectedly exert the above-described effect, and the ITO particles according to the present embodiment have been developed. Actions and effects thereof are not certain, but it is considered that satisfactory dispersibility in the dispersion can be exerted as a result of reducing a maximum contact area while maintaining high crystallinity (note that actions and effects according to the present embodiment are not limited thereto).

The ITO particles according to the present embodiment preferably have an aligned crystal orientation inside the particles. The "aligned crystal orientation" described herein indicates that a spot pattern is confirmed in an electron beam diffraction image of one particle as a whole.

The average particle diameter of the ITO particles is not particularly limited, and preferably falls within a range from 3 nm to 50 nm, more preferably, from 5 nm to 40 nm. The average particle diameter falls within such range, and thus dispersibility of the ITO particles can further be improved.

A BET specific surface area of the ITO particles is not particularly limited, and preferably falls within a range from 25 $cm^2/g$ to 49 $cm^2/g$. Note that the "BET specific surface area" described herein is measured by BET gas adsorption measurement. Note that, in view of dispersibility when dispersion is adopted, the ITO particles preferably satisfy the above-mentioned range of the average particle diameter, and also preferably satisfy the range of the BET specific surface area. The particles satisfying those ranges can exert higher dispersibility.

Regarding the component composition of the ITO particles, a molar ratio of a content amount of Sn to a content amount of In (Sn/In) is not particularly limited, and preferably fall within a range from 3.5 to 24, more preferably, from 3.7 to 23.5, further preferably, from 4 to 23, in view of crystal synthesis and conductivity.

<Production Method of ITO Particles>

The ITO particles according to the present embodiment are preferably produced by the following method instead of the gel-sol method. Specifically, the production method preferably includes: (1) a reaction process of obtaining ITO particles by causing a reaction at a temperature from 190° C. to 200° C. for 12 hours to 120 hours in a solution containing In salt from 0.09 M to 0.9 M (M=mol/L), Sn salt from 0.01 M to 0.2 M (M=mol/L), a basic compound, and a solvent; and (2) a process of washing the ITO particles.

The concentration of the In salt in the reaction solution preferably falls within a range from 0.09 M to 0.9 M, more preferably, 0.09 M to 0.45 M. Further, the concentration of the Sn salt in the reaction solution preferably falls within a range from 0.01 M to 0.2 M, more preferably, from 0.01 M to 0.05 M.

The concentration of the In salt is preferably from 4.5 times to 9 times, more preferably, from 5 times to 9 times of the concentration of the Sn salt in terms of mole. A particle synthesis reaction is performed with those metal source concentrations, and thus the ITO particles according to the present embodiment can be synthesized more easily in one pot.

The In salt is not particularly limited, and publicly-known one may be used as a raw material for ITO. For example, one selected from a group including: metal salt such as $InCl_3$; $In_2(C_2O_4)_3$, $In(NO_3)_3$, $In_2(SO_4)_3$, and hydrates thereof is exemplified. Among those, anhydrous salt and metal salt are preferred, metal salt is more preferred, and $InCl_3$ is further preferred.

The Sn salt is not particularly limited, and publicly-known one may be used as a raw material for ITO. For example, one selected from a group including: metal salt such as $SnCl_2$, $SnCl_4$, $Sn_2(C_2O_4)_3$, $Sn(NO_3)_2$, and $SnSO_4$, and hydrates thereof is exemplified. Among those, anhydrous salt and metal salt are preferred, metal salt is more preferred, and $SnCl_2$ and $SnCl_4$ are further preferred.

The basic compound is not particularly limited, and is only required to be capable of neutralizing the reaction solution and extracting precipitated In—Sn hydroxides (neutralization and coprecipitation). A publicly-known basic compound may be used. For example, tetramethylammonium hydroxide (TMAH), sodium hydroxide, and the like are exemplified.

The concentration of the basic compound in the reaction solution is not particularly limited, and preferably falls within a range from 1 M to 2 M, more preferably, from 1.5 M to 1.7 M, in view of the particle synthesis.

The solvent is only required to be capable of dissolving In salt, Sn salt, the basic compound, and other additives used as needed. A publicly-known solvent can be used, and water and alcohols such as methanol, ethanol, isopropanol and the like are preferred, for example.

In the reaction process (1), other additives may be added as needed without inhibiting the effects of the present embodiment.

The reaction time in the reaction process (1) preferably falls within a range from 12 hours to 120 hours, more preferably, from 24 hours to 72 hours.

The reaction temperature in the reaction process (1) preferably falls within a range from 190° C. to 200° C.

The reaction process (1) may be performed in an open system, but an autoclave is preferably used. With this, generation of coprecipitate of an indium hydroxide and a tin hydroxide that are generated in the reaction system can be promoted.

A mechanism of obtaining the ITO particles according to the present embodiment by the above-mentioned production method is not known exactly. However, control for the concentrations of the metal salt in the reaction system (M=mol/L), the reaction temperature, the reaction time, and the like are considered to have influence thereon. Control for a shape of monodisperse particles may be performed by the number of nuclei generated in the system and the mass present therein. However, it is considered that uneven nucleation is further required on the nuclei while maintaining the nuclei in the gel network. Thus, it is considered that the metal source concentrations are preferably increased and that the amount of the base with respect to the metal sources are preferably small. With this, concentration of a metal oxide precursor for generating the nuclei may be maintained for a long time period. It is considered that the ITO particles according to the present embodiment can be synthesized by combining the above-mentioned conditions (note that actions and effects according to the present embodiment are not limited thereto).

In order to produce the ITO particles according to the present embodiment, the metal source concentrations are preferably increased, and the base concentration is preferably relatively low with respect to the metal sources. With this, instead of growing the particles after the initial nucleation reaction, uneven nucleation can further be promoted on the generated nuclei. As a result, the ITO particles according to the present embodiment can be synthesized.

In the present embodiment, a centrifugal separation process is preferably performed between the reaction process (1) and the washing process (2). The centrifugal separation process is preferably performed for ten minutes at 14,000 rpm.

In the process (2) of washing the ITO particles, washing is preferably performed through use of water, alcohols such as ethanol, or the like. When washing is performed with water, pure water such as distilled water, ion exchanged water (IEW) and the like, is preferably used. Further, washing is preferably performed by processing the dispersion with an ultrasonic washing machine.

Note that, in the related art, a freeze-drying process and a reduction firing process are performed after the reaction process. However, in the present embodiment, these processes may not be performed. In view of this, particularly, a firing process is preferably prevented from being performed after the process (2). With this, aggregation of the ITO particles can be prevented, and a monodisperse state in a dispersion medium can be maintained.

<Dispersion>

Dispersion can be obtained by dispersing the ITO particles according to the present embodiment in a solvent.

The solvent is not particularly limited, and water, alcohols such as methanol, ethanol, isopropyl alcohol and the like, and a mixed solvent thereof are exemplified. Among those, water and alcohols are preferred, and water is more preferred. Specifically, the dispersion according to the present embodiment may be suitably used as aqueous dispersion.

Other additives and the like may be blended to the dispersion as needed.

In a case where general ITO particles are dispersed in a solvent for a long time period, a surfactant is required for preventing aggregation of the ITO particles. However, in the dispersion according to the present embodiment, the dispersion in which the ITO particles can be dispersed for a long time period can be obtained without adding a surfactant. Thus, the dispersion according to the present embodiment can be dispersion that does not contain a surfactant substantially, that is, surfactant-free dispersion.

The surfactant described herein indicates one having a function of adsorbing particle surfaces and causing the particles to be dispersed in a dispersion medium. Specific examples include an anionic surfactant, a cationic surfactant, and a nonionic surfactant.

In the dispersion according to the present embodiment, a ratio (volume ratio) of the ITO particles with respect to the solvent is not particularly limited, but is preferably 40% or less. With this range, monodispersion can be performed stably for a long period.

<Production Method of Dispersion>

As a production method of dispersion, a method of dispersing the ITO particles according to the present embodiment in a solvent is exemplified.

Although not particularly limited, the production method of dispersion is preferably a method including (1) a reaction process of obtaining ITO particles by causing a reaction at a temperature from 190° C. to 200° C. for 12 hours to 120 hours in a solution containing In salt 0.09 M to 0.9 M, Sn salt 0.01 M to 0.2 M, a basic compound, and a solvent; (2) a process of washing the ITO particles; and (3) a process of dispersing the washed ITO particles in a solvent.

The process (1) and the process (2) may be performed similarly to the process (1) and the process (2) that are already described as the production method of the ITO particles.

The dispersion process (3) is performed by adding water to the ITO particles immediately after the washing and mixing the particles and a dispersion medium evenly. The dispersion method is not particularly limited. A stirring method by a stirrer or the like and an ultrasonic dispersion method by an ultrasonic bus or the like may be used, and those methods may be used in combination. Among those, an ultrasonic bus is preferably used.

<ITO Film>

An ITO film can be produced through use of the dispersion according to the present embodiment. Specifically, the production method of the ITO film is preferably a production method including: (i) a mist formation process of forming the dispersion according to the present embodiment into mist; (ii) a contact process of bringing the mist dispersion into contact with a base plate; and (iii) a drying process of drying the dispersion present on the base plate after the contact process.

The ITO film is a material having high conductivity and transparency, and is commonly used as a transparent conductive material. Examples of the production method of ITO film include methods such as spattering and laser deposition. However, with such technique, it is difficult to form an even thin film on a flexible base plate, and characteristics of the ITO having an excellent surface property cannot be fully utilized. Further, a large-scale facility configuration is required in a deposition process or the like. Regarding this point, there is also room for improvement.

In view of this, the dispersion according to the present embodiment has high dispersibility without sedimentation of components. Thus, a simple mist technique can be used at the time of forming an ITO thin film on a base plate. Further, limitations of a material of the base plate can be relaxed, and thus a film can be formed on the flexible base plate described above. Further, even when the ITO particles according to the present embodiment are at a nano-level (ITO nano particles), high crystallinity and monodispersibility can be maintained stably. Thus, a surface property of a thin film such as conductivity and transparency can also be controlled at a high level.

The mist formation process (i) is only required to be a method of forming the dispersion into mist. As a method of generating mist, a publicly-known method can be adopted. For example, a pressurization type, a rotary disk type, an ultrasonic type, an electrostatic type, an orifice oscillation type, a steam type, and the like can be adopted. In the present embodiment, for the dispersion of the ITO particles, a physical method of forming mist is preferable. With this, temperature control for liquid and size control for a liquid droplet are facilitated. Further, the dispersion is dealt with as mist. Thus, high controllability is obtained, and a defect such as distortion at the time of forming a thin film, which is caused by the sol-gel method of supplying liquid, is not caused.

In the mist formation process, carrier gas is used, and thus the mist dispersion can be carried until the subsequent contact process. As the carrier gas, inert gas such as argon, helium, nitrogen and the like, can be used.

Further, between the process (i) and the process (ii), a process of uniforming the mist with a mist trap and a stagnation process of providing a stagnation period (stagnation portion) for the mist may be performed.

The contact process (ii) is not particularly limited as long as the method enables the mist to be brought into contact with the base plate, and a publicly-known technique can be adopted. For example, there is exemplified a method of spraying, onto the base plate, fine liquid droplets obtained by a mist method in the mist formation process. Examples of the mist method include ultrasonic spray, a mist CVD method, a linear source type, and a hot wall type. Selection may be made among those methods in consideration of a film thickness of the ITO film formed on the base plate, a size of liquid droplets to be sprayed, and the like.

The contact process may be performed under any one of atmospheric pressure, reduced pressure, and vacuum. In view of convenience, atmospheric pressure is preferable.

Further, the mist dispersion is applied on the base plate subjected to masking, and thus a fine and minute pattern can be formed, which is suitable when ITO nano particles are formed into a thin film on a base plate, in particular. With this, dimension control can be performed at high accuracy.

When water is used as the solvent of the dispersion, a water-repellent masking material (water-repellent film) is preferably used as a masking material. With this, the pattern can be formed at higher accuracy.

Further, limitations of a material of a base material can be relaxed, and thus a film base material that is thin and has high flexibility (also referred to as a sheet base material) can also be used as the base material. Moreover, continuous production in, for example, a roll-to-roll manner is also enabled.

For example, publicly-known materials can be used as the base material. Glass, polyethylene terephthalate (PET), polyethylene naphthalate (PEN), polyethersulfone (PES), polyether imide, polyetheretherketone, polyphenylene sulfide, polyarylate, polyimide, polycarbonate (PC), cellulose triacetate (TAC), cellulose acetate propionate (CAP), and the like are exemplified.

In the drying process (iii), the solvent in the dispersion sprayed on the base plate is removed. For example, the solvent is vaporized by photoirradiation with infrared light or the like, or heating, and thus an ITO film is formed on the surface of the base plate. Heating temperature can be set in consideration of a boiling point of the solvent, a softening point of the base plate, and other factors that may influence a physical property of the ITO film. The softening point of the base plate described herein indicates temperature at which softening and deformation of the base plate start when the base plate is heated, and can be obtained by a test method according to JIS K7191-1, for example.

After the process (iii), a process of annealing the base plate having the ITO film formed thereon (annealing process), a UV irradiation process for the purpose of modifying the base material, for example, imparting hydrophilicity, and the like may be performed as needed.

Figure 1:
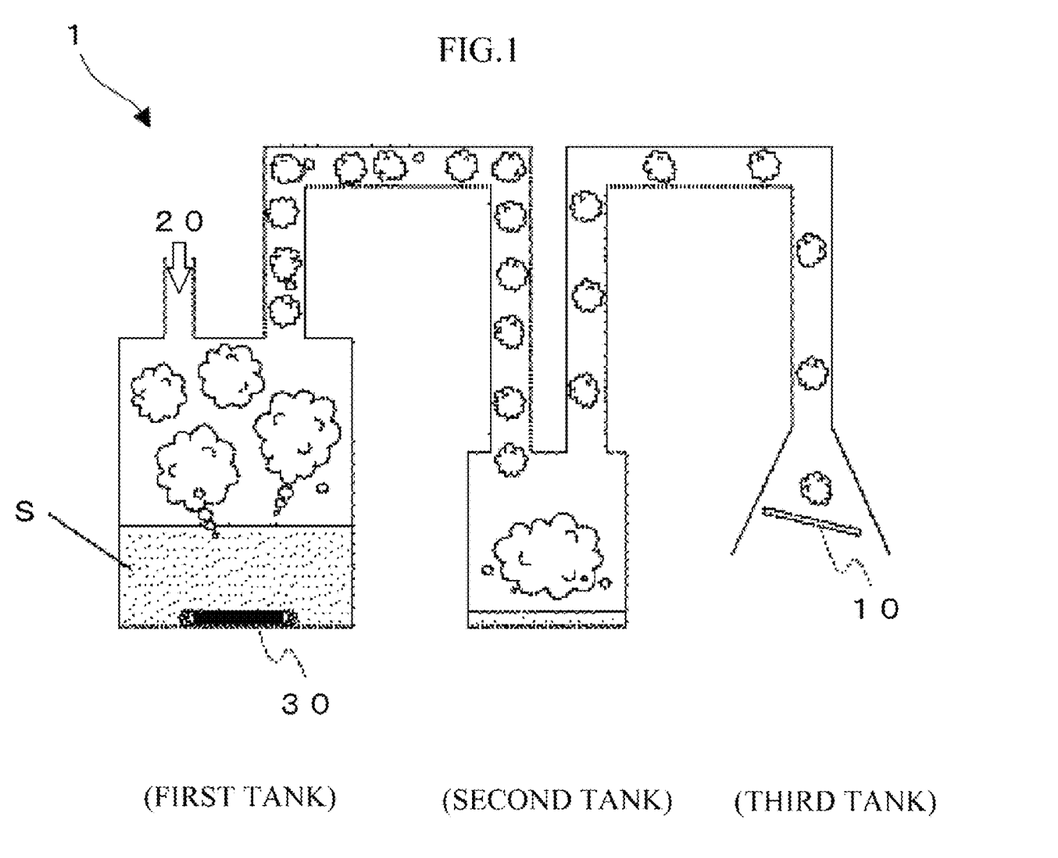
FIG. 1 is a schematic diagram illustrating one example of a film formation device using a mist method in the present embodiment.

Here, regarding a film formation device, FIG. 1 is a schematic diagram illustrating one example of a film formation device using the mist method in the present embodiment. A film formation device 1 includes a first tank in which mist containing fine particles is generated, a second tank being a mist trap for uniforming the mist, and a third tank in which the mist is sprayed onto a base plate 10.

The above-mentioned dispersion is stored as a raw material solution S in the first tank. The above-mentioned particles may be used for particles in the dispersion, and nano fine particles are preferable. Here, description is made on a case where ITO fine particles are used as the particles.

In the first tank, air 20 is caused to flow for the purpose of forming a flow path of the mist.

An ultrasonic oscillator 30 is stored in the first tank. The ultrasonic oscillator 30 forms the dispersion containing the ITO fine particles into mist. A particle diameter of the mist is not particularly limited, and is preferably 10 μm or less (a range of, for example, from 1 μm to 10 μm). The mist generated in the first tank is conveyed to the second tank through a pipe provided to the first tank. In the second tank, excessive mist stagnates in the lower part of the tank, and the mist having a further uniformed particle diameter is conveyed to the third tank through a pipe provided to the second tank. Such configuration that the mist having a particle diameter of 5 μm or less (a range of, for example, from 1 μm to 5 μm) is conveyed from the second tank to the third tank is preferable.

The base plate 10 is arranged in the third tank, the mist conveyed from the second tank is sprayed onto the base plate. In the third tank, the mist is sprayed onto the base plate 10 for a predetermined time period. Further, a dispersion medium in the mist adhering to the base plate 10 is vaporized, and thus an ITO film is formed on the surface of the base plate 10. Note that, when a certain time period elapses from the spraying, the mist newly adheres onto the base plate 10 before the mist is vaporized. Thus, the dispersion formed into the liquid droplets flows down, and a uniform ITO film is not formed on the base plate 10. A timing at which spraying of the mist onto the base plate 10 is stopped may be a timing at which the mist containing the ITO fine particles is liquefied and flows down from the base plate 10 or a timing at which the ITO film having a desired film thickness is formed on the base plate 10.

In the third tank, when the base plate 10 is heated excessively, deformation may be caused due to softening. Thus, in the third tank, the mist is preferably sprayed at temperature lower than the softening point of the base plate, to form the ITO film. Further, when the base plate 10 is heated at predetermined temperature or higher at the time of spraying the mist, the ITO fine particles adhering to the base plate 10 are aggregated. As a result, evenness of the film is degraded, and a conductive network among the particles is inhibited. Thus, an ITO film having a high resistance value is formed. Therefore, more preferably, it is configured that the mist is sprayed at temperature of 40° C. or lower (a range of, for example, from 10° C. to 40° C.), to form the ITO film.

In a case where a metal oxide film is selectively formed on the base plate 10, when a water-repellent film is selectively formed on the base plate 10 in advance, the mist is caused to adhere to a hydrophilic part. In this case, when the base plate 10 is arranged horizontally, the dispersion adhering to a water-repellent part is not repelled, and a metal oxide film cannot be formed selectively. Thus, in the third tank, the mist is preferably sprayed onto the base plate 10 inclined with respect to the horizontal plane.

Similarly, in the third tank, the mist is preferably sprayed onto the base plate 10 inclined with respect to a plane perpendicular to a spray direction of the mist. This is for the purpose of removing excessing ITO fine particles adhering to the water-repellent part, with a blowing force of the sprayed mist.

Note that the mist trap in the second tank may be omitted in the film formation device. In this case, relatively large liquid droplets can be subjected to filtering, and the ITO film can be formed accurately even when a hydrophilic/water-repellent pattern on the base plate is fine and minute.

Further, regarding the method of generating mist, in addition to the above-mentioned method using the ultrasonic oscillator 30, an electrostatic type in which mist is generated by applying a voltage directly to a tube for spraying liquid droplets, a pressurization type in which generated mist scatters by causing gas at a flow rate increased due to pressurization to collide against liquid, a rotary disk type in which liquid droplets drip onto a disk rotating at a high speed to cause generated mist to scatter with a centrifugal force, an orifice oscillation type in which, when liquid droplets are caused to pass through an orifice plate having micro sized pores, the liquid droplets are cut by applying oscillation by a piezoelectric element or the like to generate micro sized liquid droplets, and the like can be adopted. Selection is made as appropriate from those methods of generating mist in accordance with cost, performance, and the like. As a matter of course, a plurality of methods may be combined to generate mist.

EXAMPLES

The present invention is described more in detail with reference to Examples and Comparative Examples given below. However, the present invention is not limited at all by the examples given below.

<Measurement Method>

XRD Measurement:

A multipurpose X-ray diffractometer ("Ultima-IV" available from Rigaku Corporation) was used as a measurement device. Measurement was performed under the following conditions: a radiation source of CuKα; an output of 40 kV and 40 mA; and a detector being "D/teX Ultra".

ICP Measurement:

An ICP emission spectrum analyzer ("Optima 3300" available from PerkinElmer, Inc.) was used as a measurement device.

TEM Measurement:

A transmission type electron microscope (TEM, "JEM-2100" available from Hitachi, Ltd.) was used as a measurement device, and measurement was performed under a condition, that is, power of 120 k.

Shape Evaluation on ITO Particles:

A TEM photographed image of ITO particles was subjected to image processing through use of the image processing software "image) 1.5K". Specifically, a target image was initially taken in, and was converted into an 8-bit grayscale image. Subsequently, a size per pixel, which was expressed in nanometers, was set with "Set Scale", and thus a scale of one-pixel corresponded to an actual value.

Subsequently, in order to clarify a shape of particles, "Enhance Contrast" was used, and Saturated Pixels were set to approximately 20% to 40%. This value affected a contrast of the entire image, and hence was required to be adjusted as appropriate. The value that clarified a particle contour was set as a standard. Further, binarization was performed in order to separate the shape of the particles from other matters with "Threshold". In this case, a threshold value was set through use of algorithm called "Moments".

Further, finally, "Analyze Particles" was selected to measure the shape of the particles. For the setting at the time of measurement, "Size (Pixels^2)" was set to 1000-Infinity, and thus contamination or background noise were able to be eliminated. Among the obtained results, "Area" and "Perim." were focused on, and were indicated as a particle area S and a particle perimeter P in a TEM photographed image, respectively.

Further, calculation was performed to determine whether a relationship in Expression (1) given below was satisfied. Note that, when two or more particles were photographed in the photographed image, a value of "16×S/P$^2$" was calculated for each particle, the arithmetical mean of the values was obtained, and it was confirmed whether the value was 0.330 or less. Further, when only a part of a particle was photographed in the photographed image, the particle was not subjected. A particle area and a perimeter of a particle whose entirety was photographed were adopted.

$$16 \times S/P^2 \leq 0.330 \tag{1}$$

(In the expression, S indicates a particle area in a TEM photographed image, and P indicates a perimeter of the particle.)

Note that the value of "16×S/P$^2$" used herein was defined in view similar to circularity "4π×(area of circle)/(circumference)$^2$" known as a shape factor of an image analysis. In a case of circularity, the value was 1 when the shape was a circle, and the value was close to 0 as the shape was away from a circle. Specifically, in a case of "16×S/P$^2$", the value was 1 when the particle shape in the TEM image was a square, and the value was close to 0 as the particle shape in the TEM image was away from a square. The related-art ITO particles were obtained in a substantially rectangular parallelepiped shape. Thus, the related-art ITO particles were observed to have a shape close to a square in the TEM image, and the value of "16×S/P$^2$" approximated 1. However, the value of "16×S/P$^2$" of the ITO particles according to the present embodiment was 0.330 or less. The main reasons for this were considered as follows: the ITO particles according to the present embodiment had a particle shape different from a substantially rectangular parallelepiped shape in the related art, and the recesses and the protrusions were formed on the particle contour observed in the TEM image.

Example 1

(Preparation of ITO Particles and Dispersion)

In a reactor vessel, 7.5 mL of methanol as a solvent and 1.6 M of tetramethylammonium hydroxide (TMAH) as a basic catalyst were prepared. Further, a methanol solution was produced so that the In concentration was 0.36 M and the Sn concentration was 0.04 M in the reaction solution (In/Sn=9 in the reaction solution). This was added in the above-mentioned TMAH methanol solution, was stirred for 10 minutes, and then was heated at 190° C. for a day to progress a reaction. After that, centrifugal separation was performed at 14,000 rpm for 10 minutes. Subsequently, washing was performed twice with ethanol and twice with ion exchanged water, and ITO particles were obtained. The obtained ITO particles were blue on the surfaces.

(Measurement Result of ITO Particles)

According to the XRD, a diffraction pattern attributable to indium oxide (In$_2$O$_3$) having the same crystal structure as that of ITO was successfully obtained. With this, it was confirmed that ITO was synthesized. With the ICP, it was confirmed that Sn/In (molar ratio) of the ITO particles was equal to 12.3.

(Preparation of Dispersion)

Subsequently, dispersion was prepared with the obtained ITO particles. Specifically, 40 mL of pure water (a surfactant was not added) was mixed with 1 g of the ITO particles. Further, the particles and the pure water were mixed in an ultrasonic bus, and thus dispersion was obtained.

(Evaluation on Dispersibility of Dispersion)

The obtained dispersion was caused to stand still at 20° C. for 100 days. As a result, generation of precipitate was not confirmed by eyes. From those points, it was at least confirmed that the dispersion in Example 1 had high stability and excellent dispersibility.

Examples 2 to 10

Figure 2:
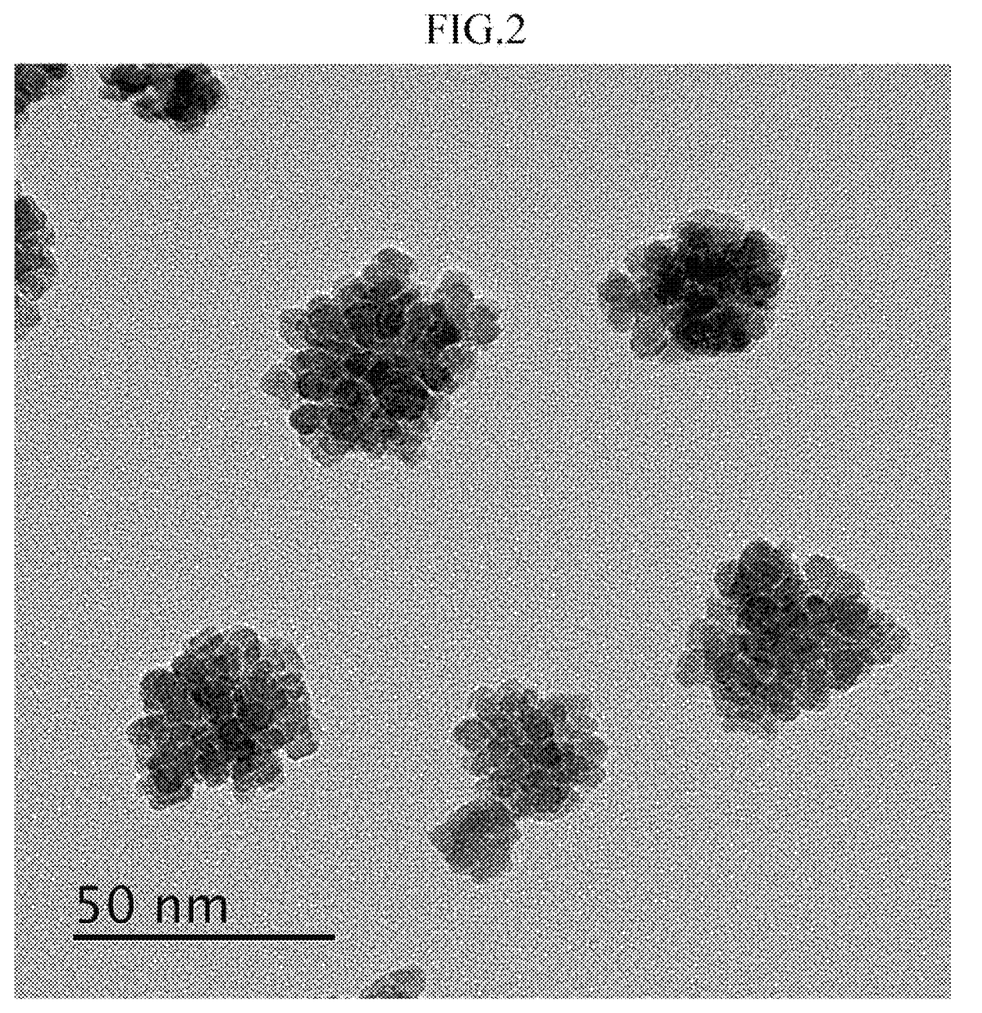
FIG. 2 is a transmission type electron microscope (TEM) photograph in Example 1.

The prepared concentrations of In and Sn were changed, and a test was conducted. ITO particles and dispersion thereof were produced similarly to Example 1 except that the ITO particles were produced under the conditions shown in Table 1 and Table 2, and a physical properties thereof were evaluated. Note that, a transmission type electron microscope (TEM) photograph in Example 1 is shown in FIG. 2.

Production conditions and evaluation results of dispersion in Examples 1 to 10 are shown in Table 1 and Table 2. Note that, in the item "crystal orientation", a case where a spot pattern was confirmed by the electron beam diffraction method is marked with a circle "○", and the opposite case is marked with a cross mark "x". In the item "dispersibility of dispersion", for evaluation on dispersibility, a case where generation of precipitate was not confirmed by eyes is marked with a circle "○", and a case where generation of precipitate was confirmed is marked with a cross mark "x". Further, in all of Examples, a spot pattern was confirmed in an electron beam diffraction image of one particle as a whole.

(Measurement of Zeta Potential)

Here, as an index for evaluating dispersibility in viewpoint of a chemical state of the particles, a zeta potential of the ITO particles in Example 1 was measured. The zeta potential was measured through use of a zeta potential measurement device ("ELSZ-2" available from Otsuka Electronics Co., Ltd.) with $1 \times 10^{-2}$ M NaOH and $1 \times 10^{-2}$ M $HClO_4$ water solution under a condition of ionic strength being $1 \times 10^{-2}$.

Figure 3:
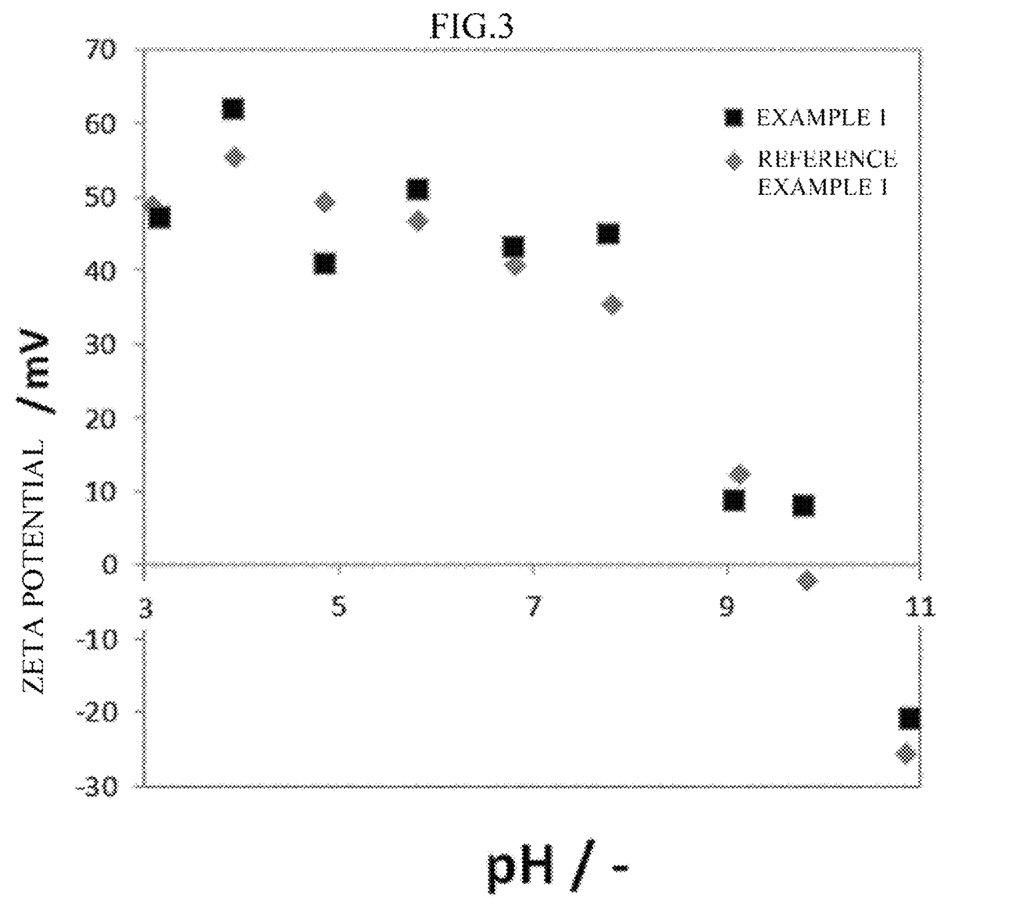
FIG. 3 is a graph obtained by plotting measurement results of zeta potentials in Example 1 and Reference Example 1.

Note that, as Reference Example 1, a zeta potential of ITO particles (a particle shape was substantially rectangular parallelepiped), which were produced in accordance with a method described in Chem. Lett., 42, 738 (2013), was measured under the same conditions. As a result, an isoelectric point (pH 0) of the ITO particles in Example 1 was 10.27, and an isoelectric point (pH 0) in Reference Example 1 was 9.73. FIG. 3 is a graph showing measurement results of zeta potentials in Example 1 and Reference Example 1.

As shown in FIG. 3, the zeta potential of the ITO particles in Example 1 was substantially equal to the zeta potential of the ITO particles in Reference Example 1. From this point, it can be understood that there was not a large difference between the chemical states of the particles in Example 1 and Reference Example 1. Therefore, it can be understood that the ITO particles in Example 1 had excellent dispersibility even though the chemical state of the particle surfaces was not largely different from that of the ITO particles in Reference Example 1. The ITO particles in Example 1 had a specific shape, a contact surface between the particles in the solution was reduced, and aggregation was suppressed. Thus, it can be understood that excellent dispersibility was exerted as a result.

TABLE 1

|  | Example 1 | Example 2 | Example 3 | Example 4 | Example 5 |
|---|---|---|---|---|---|
| Prepared In (M) | 0.36 | 0.225 | 0.27 | 0.315 | 0.45 |
| Prepared Sn (M) | 0.04 | 0.025 | 0.03 | 0.035 | 0.05 |
| In/Sn in reaction solution (M ratio) | 9 | 9 | 9 | 9 | 9 |
| P perimeter (nm) | 334.127 | 772.017 | 439.801 | 444.271 | 364.194 |
| S particle area ($nm^2$) | 923.415 | 4263.543 | 2969.506 | 2079.986 | 1085.334 |
| $16 \times S/P^2$ | 0.132 | 0.114 | 0.246 | 0.170 | 0.133 |
| Sn/In of ITO particles (molar ratio) | 12.3 | 12.7 | 12.7 | 13.2 | 7.66 |
| Crystal orientation | ○ | ○ | ○ | ○ | ○ |
| Dispersibility of dispersion | ○ | ○ | ○ | ○ | ○ |

TABLE 2

|  | Example 6 | Example 7 | Example 8 | Example 9 | Example 10 |
|---|---|---|---|---|---|
| Prepared In (M) | 0.54 | 0.63 | 0.72 | 0.81 | 0.9 |
| Prepared Sn (M) | 0.06 | 0.07 | 0.08 | 0.09 | 0.1 |
| In/Sn in reaction solution (M ratio) | 9 | 9 | 9 | 9 | 9 |
| P perimeter (nm) | 956.141 | 423.439 | 286.775 | 393.614 | 558.117 |
| S particle area ($nm^2$) | 5710.765 | 1297.545 | 813.570 | 1739.366 | 2278.947 |
| $16 \times S/P^2$ | 0.100 | 0.117 | 0.140 | 0.180 | 0.117 |
| Sn/In of ITO particles (molar ratio) | 8.85 | 5.70 | 6.71 | 8.43 | 5.25 |
| Crystal orientation | ○ | ○ | ○ | ○ | ○ |
| Dispersibility of dispersion | ○ | ○ | ○ | ○ | ○ |

Examples 11 to 16

Based on Example 1, the reaction time in the reaction process was changed, and a test was conducted. ITO particles and dispersion thereof were produced similarly to Example 1 except that the ITO particles were produced under the conditions shown in Table 3. Note that, in all of Examples, a spot pattern was confirmed in an electron beam diffraction image of one particle as a whole.

TABLE 3

|  | Example 11 | Example 12 | Example 13 | Example 14 | Example 15 | Example 16 |
|---|---|---|---|---|---|---|
| Reaction time (day(s)) | 12 h | 18 h | 1 day | 2 days | 3 days | 5 days |
| P perimeter (nm) | 289.995 | 417.373 | 400.808 | 345.039 | 572.780 | 163.003 |
| S particle area (nm$^2$) | 1323.407 | 2753.832 | 1114.289 | 1667.998 | 1428.063 | 289.663 |
| 16 × S/P$^2$ | 0.252 | 0.253 | 0.111 | 0.224 | 0.066 | 0.162 |
| Sn/In of ITO particles (molar ratio) | 3.98 | 4.65 | 6.52 | 5.60 | 5.56 | 7.40 |
| Crystal orientation | ○ | ○ | ○ | ○ | ○ | ○ |
| Dispersibility of dispersion | ○ | ○ | ○ | ○ | ○ | ○ |

Example 17

Based on Example 1, the reaction temperature in the reaction process was changed, and a test was conducted. ITO particles and dispersion thereof were produced similarly to Example 1 except that the ITO particles were produced under the conditions shown in Table 4. Note that, in Example 17, a spot pattern was confirmed in an electron beam diffraction image of one particle as a whole.

TABLE 4

|  | Example 17 |
|---|---|
| Reaction temperature (° C.) | 200° C. |
| P perimeter (nm) | 303.253 |
| S particle area (nm$^2$) | 778.332 |
| 16 × S/P$^2$ | 0.146 |
| Sn/In of ITO particles (molar ratio) | 13.6 |
| Crystal orientation | ○ |
| Dispersibility of dispersion | ○ |

Examples 18 to 21

Based on Example 1, the Sn doping amount was changed, and a test was conducted. ITO particles and dispersion thereof were produced similarly to Example 1 except that the ITO particles were produced under the conditions shown in Table 5. Note that, in all of Examples, a spot pattern was confirmed in an electron beam diffraction image of one particle as a whole.

TABLE 5

|  | Example 18 | Example 19 | Example 20 | Example 21 |
|---|---|---|---|---|
| Reaction temperature | 190° C. | 200° C. | 190° C. | 200° C. |
| Prepared In (M) | 0.36 | 0.36 | 0.54 | 0.54 |
| Prepared Sn (M) | 0.08 | 0.08 | 0.12 | 0.12 |
| In/Sn in reaction solution (M ratio) | 4.5 | 4.5 | 4.5 | 4.5 |

TABLE 5-continued

|  | Example 18 | Example 19 | Example 20 | Example 21 |
|---|---|---|---|---|
| P perimeter (nm) | 378.821 | 594.304 | 806.074 | 595.462 |
| S particle area (nm$^2$) | 675.023 | 1362.442 | 2008.580 | 2440.151 |
| 16 × S/P$^2$ | 0.075 | 0.062 | 0.049 | 0.110 |
| Sn/In of ITO particles (molar ratio) | 12.0 | 23.2 | 13.6 | 20.8 |
| Crystal orientation | ○ | ○ | ○ | ○ |
| Dispersibility of dispersion | ○ | ○ | ○ | ○ |

Comparative Example 1

ITO particles were produced under conditions similar to those in Example 1 except that a condition was changed so that the In concentration was 0.18 M and the Sn concentration was 0.02 M (In/SN=9 in the reaction solution). Regarding the ITO particles, the perimeter P was 257.889 nm, and the particle area S was 1420.468 nm$^2$. Specifically, the ITO particles satisfied 16×S/P$^2$=0.342, and were ITO particles that did not satisfy the relationship in Expression (1). When dispersibility evaluation was performed on the ITO particles, generation of precipitate was confirmed by eyes, and an evaluation result was "x".

REFERENCE SIGNS LIST

1 Film formation device
10 Base plate
20 Air
30 Ultrasonic oscillator
S Raw material solution

What is claimed is:

1. ITO particles satisfying a relationship expressed in Expression (1) given below:

$$16 \times S/P^2 \leq 0.330 \quad (1)$$

wherein S indicates a particle area in nm$^2$ for a single particle in a TEM photographed image, and P indicates a perimeter in nm of the single particle, and wherein an aligned crystal orientation is provided inside of the particles.

2. The ITO particles according to claim 1, wherein a molar ratio of a content amount of Sn to a content amount of In (Sn/In) falls within a range from 3.5 to 24.

3. Dispersion comprising the ITO particles according to claim 1, dispersed in a solvent.

4. The dispersion according to claim 3, wherein the solvent comprises water.

5. The dispersion according to claim 3, wherein the dispersion is substantially prevented from comprising a surfactant.

6. The dispersion according to claim 3, wherein a ratio of a volume of the ITO particles to a volume of the solvent is 40% or less.

7. A production method of an ITO film, comprising:
    forming the dispersion according to claim 3 into mist;
    bringing the misted dispersion, into contact with a base plate; and
    drying the dispersion on the base plate after the contact.

* * * * *